(12) United States Patent
Kishimoto

(10) Patent No.: US 9,013,757 B2
(45) Date of Patent: Apr. 21, 2015

(54) COLOR CONVERSION COEFFICIENT GENERATING APPARATUS AND METHOD, COLOR PROCESSING APPARATUS, AND NON-TRANSITORY COMPUTER READABLE MEDIUM

(71) Applicant: Fuji Xerox Co., Ltd., Minato-ku, Tokyo (JP)

(72) Inventor: Yasunari Kishimoto, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 14/059,702

(22) Filed: Oct. 22, 2013

(65) Prior Publication Data

US 2014/0233070 A1      Aug. 21, 2014

(30) Foreign Application Priority Data

Feb. 20, 2013   (JP) .................................. 2013-031084

(51) Int. Cl.
*H04N 1/60* (2006.01)
*H04N 1/40* (2006.01)
*G03F 3/08* (2006.01)
*G06K 9/00* (2006.01)

(52) U.S. Cl.
CPC ....................................... *H04N 1/60* (2013.01)

(58) Field of Classification Search
CPC .............. G06T 11/001; G06T 2200/24; G06T 2207/10024; G06T 2207/20192; G06T 5/003; G06T 5/008; G09B 21/00; H04N 1/58; H04N 1/6075; A61B 3/0033; A61B 3/022; A61B 3/063; A61B 5/0075; A61B 5/1032; A61B 5/14552

USPC ........ 358/3.21, 1.9, 3.24, 518, 3.01; 382/162, 382/165, 167, 274; 345/589, 581, 591, 618
See application file for complete search history.

(56) References Cited

U.S. PATENT DOCUMENTS

| | | | |
|---|---|---|---|
| 7,394,468 B2 * | 7/2008 | Hofman et al. | ............... 345/589 |
| 7,605,930 B2 * | 10/2009 | Suzuki et al. | ............... 358/1.14 |
| 2009/0103119 A1 | 4/2009 | Okuzawa et al. | |

FOREIGN PATENT DOCUMENTS

JP         2009-100312 A      5/2009

OTHER PUBLICATIONS

Po-Chieu Hung, "Enhancement of images for colour defective observers ", 2012, 12 pages, R1-R55.
Francoise Vienot et al., "Digital Video Colourmaps for Checking the Legibility of Displays by Dichromats", Color research and application, Aug. 1999, pp. 243-252, vol. 24, John Wiley & Sons, Inc.

(Continued)

*Primary Examiner* — Charlotte M Baker
(74) *Attorney, Agent, or Firm* — Sughrue Mion, PLLC

(57) ABSTRACT

A color conversion coefficient generating apparatus includes a color vision degree coefficient calculating unit and a color conversion coefficient calculating unit. The color vision degree coefficient calculating unit calculates a color vision degree coefficient indicating the degree of color vision deficiency. The color conversion coefficient calculating unit calculates a color conversion coefficient used to convert an input color value, on the basis of correspondence between the color vision degree coefficient, calculated by the color vision degree coefficient calculating unit, and sensitivity characteristics of long- (L), medium- (M), and short- (S) wavelength-sensitive cones.

17 Claims, 8 Drawing Sheets

(56) References Cited

OTHER PUBLICATIONS

Kazunori Asada et al., "Color vision tools to improve quality of life of people with color vision deficiency", Doctoral Thesis Academic Year 2010, Graduate School of Media Design, Keio University. Abstract Only.

Nathan Moroney et al., "The CIECAM02 Color Appearance Model".

* cited by examiner

COLOR CONVERSION COEFFICIENT GENERATING APPARATUS AND METHOD, COLOR PROCESSING APPARATUS, AND NON-TRANSITORY COMPUTER READABLE MEDIUM

CROSS-REFERENCE TO RELATED APPLICATIONS

This application is based on and claims priority under 35 USC 119 from Japanese Patent Application No. 2013-031084 filed Feb. 20, 2013.

BACKGROUND

Technical Field

The present invention relates to a color conversion coefficient generating apparatus and method, a color processing apparatus, and a non-transitory computer readable medium.

SUMMARY

According to an aspect of the invention, there is provided a color conversion coefficient generating apparatus including a color vision degree coefficient calculating unit and a color conversion coefficient calculating unit. The color vision degree coefficient calculating unit calculates a color vision degree coefficient indicating the degree of color vision deficiency. The color conversion coefficient calculating unit calculates a color conversion coefficient used to convert an input color value, on the basis of correspondence between the color vision degree coefficient, calculated by the color vision degree coefficient calculating unit, and sensitivity characteristics of long- (L), medium- (M), and short- (S) wavelength-sensitive cones.

BRIEF DESCRIPTION OF THE DRAWINGS

Exemplary embodiments of the present invention will be described in detail based on the following figures, wherein.

DETAILED DESCRIPTION

Hereinafter, exemplary embodiments of the invention will be described in detail with reference to the drawings.

First Exemplary Embodiment

Figure 1:
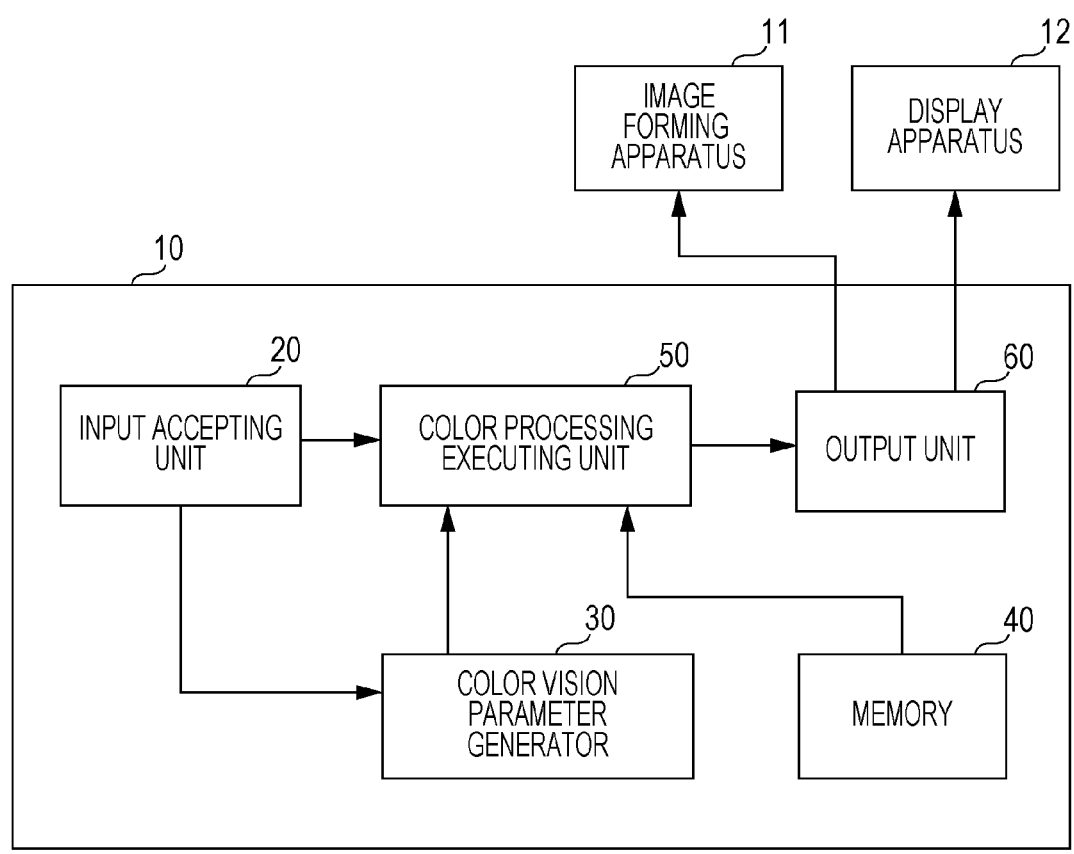
FIG. 1 is a block diagram illustrating an exemplary configuration of a color processing apparatus according to a first exemplary embodiment.

FIG. 1 is a block diagram illustrating an exemplary configuration of a color processing apparatus 10 serving as an example of a color conversion coefficient generating apparatus or a color processing apparatus according to a first exemplary embodiment.

The color processing apparatus 10 according to the first exemplary embodiment includes an input accepting unit 20, a color vision parameter generator 30, a memory 40, a color processing executing unit 50, and an output unit 60. The input accepting unit 20 serves as an example of an accepting unit or an obtaining unit that accepts an input such as information regarding color vision, which is used in color processing, or an instruction for executing color processing. The color vision parameter generator 30 generates a color vision parameter serving as a color conversion coefficient used in color processing on the basis of the instruction accepted by the input accepting unit 20. The memory 40 stores a color conversion table or the like used in color processing. The color processing executing unit 50 serves as an example of a color processing unit that applies color processing to image data or the like serving as a color processing target by using the color vision parameter generated by the color vision parameter generator 30 and the color conversion table or the like stored in the memory 40. The output unit 60 outputs the processed image data, to which color processing has been performed by the color processing executing unit 50, to an image forming apparatus 11, a display apparatus 12, or the like.

Figure 2:
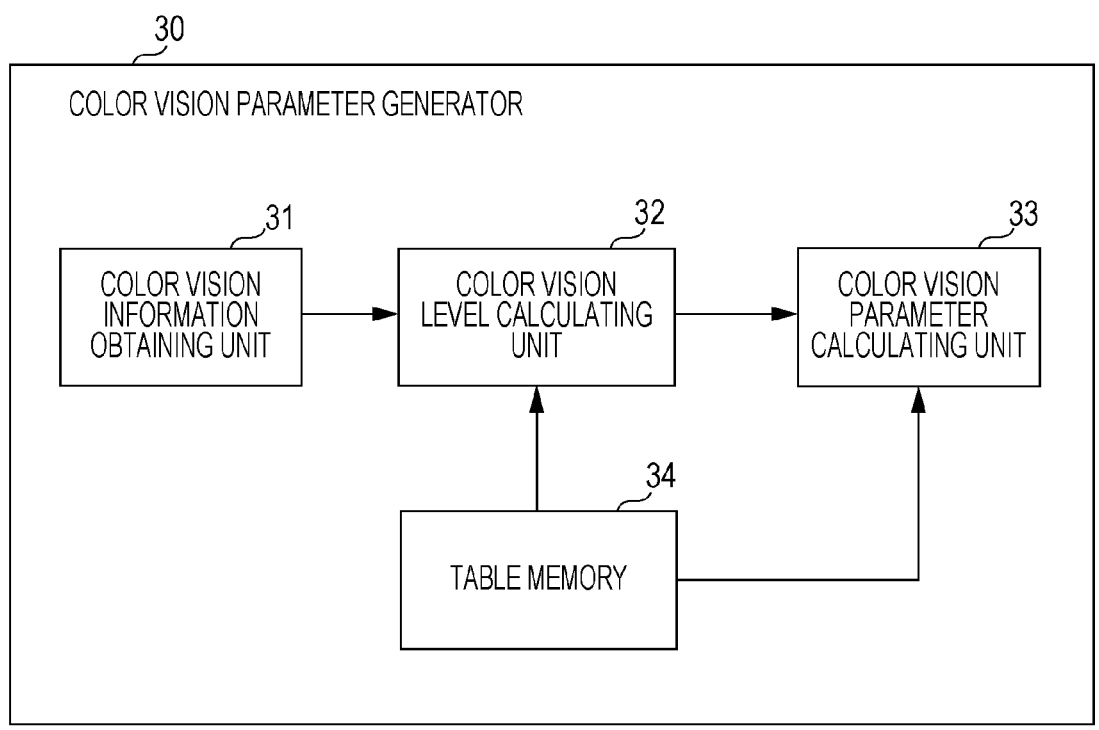
FIG. 2 is a block diagram illustrating an exemplary configuration of a color vision parameter generator according to the first exemplary embodiment.

FIG. 2 is a block diagram illustrating an exemplary configuration of the color vision parameter generator 30 according to the first exemplary embodiment.

The color vision parameter generator 30 according to the first exemplary embodiment includes a color vision information obtaining unit 31, a color vision level calculating unit 32, a color vision parameter calculating unit 33, and a table memory 34. The color vision information obtaining unit 31 obtains information regarding color vision or the like, accepted by the input accepting unit 20 (see FIG. 1). The color vision level calculating unit 32 serves as an example of a color vision degree coefficient calculating unit that calculates the degree of color vision deficiency (a color vision degree coefficient; a color vision level), which serves as a reference in color processing executed by the color processing executing unit 50 (see FIG. 1), on the basis of the information regarding color vision, obtained by the color vision information obtaining unit 31. The color vision parameter calculating unit 33 serves as an example of a color conversion coefficient calculating unit that calculates a color vision parameter used in color processing executed by the color processing executing unit 50, on the basis of the color vision level calculated by the color vision level calculating unit 32. The table memory 34 stores a color vision parameter generation table used in calculating a color vision level by the color vision level calculating unit 32 and in calculating a color vision parameter by the color vision parameter calculating unit 33.

Information regarding color vision, obtained by the color vision information obtaining unit 31, includes, for example, information regarding the type of color vision deficiency, obtained by a color vision test described later, or the like.

In the color processing apparatus 10 according to the first exemplary embodiment, the color vision parameter generator 30 generates a color vision parameter on the basis of the type of color vision deficiency or the degree of color vision deficiency, and the color processing executing unit 50 executes color processing corresponding to the type or degree of color vision deficiency by using the color vision parameter.

Now, color vision of human beings will be described.

Figure 3:
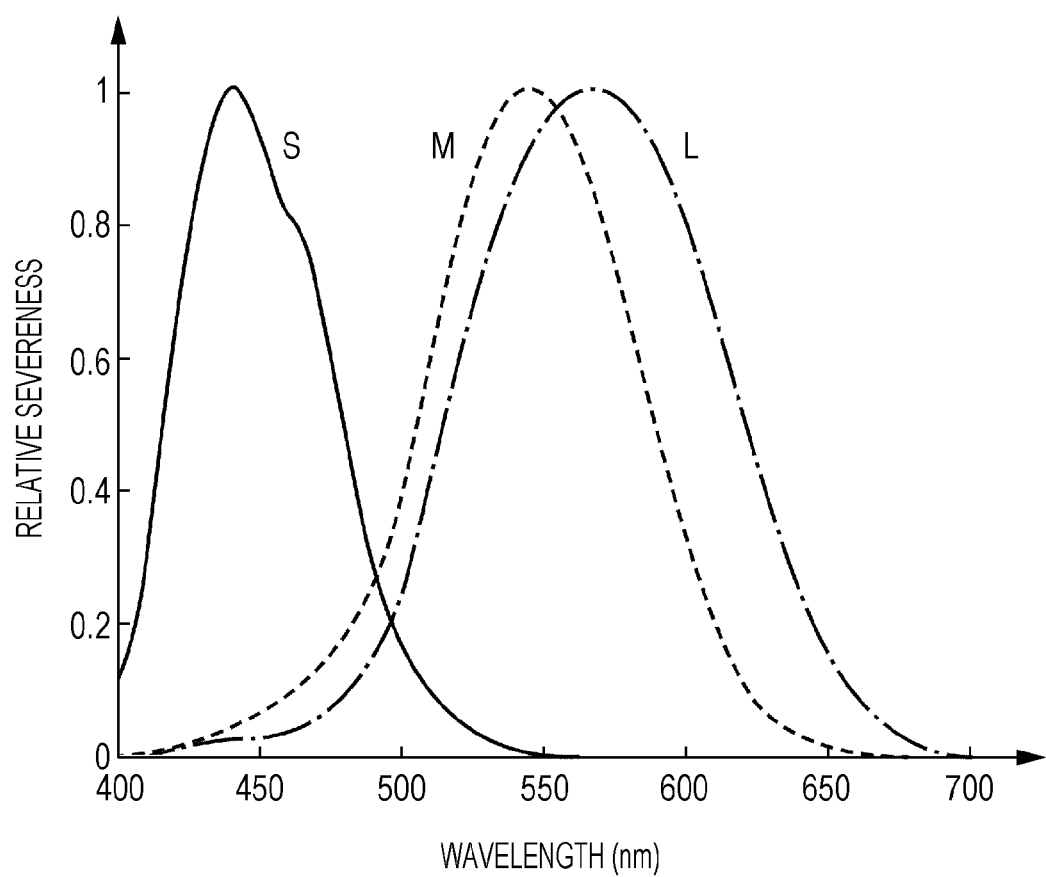
FIG. 3 is a graph representing sensitivity characteristics of three types of cones existing in the human retina.

FIG. 3 is a graph representing sensitivity characteristics of three types of cones existing in the human retina. These three types of cones have different sensitivities to the wavelength of light and are referred to as the short- (S), medium- (M), and long- (L) wavelength-sensitive cones whose sensitivity peaks range from short to long wavelengths.

Human beings generally have all of the S, M, and L cones and recognize colors on the basis of relative ratios of light intensities perceived by the three types of cones. In the following description, normal color vision in the case where a person has the three types of cones illustrated in FIG. 3 is referred to as common type (type C) color vision according to classification by the Color Universal Design Organization (CUDO), which is an incorporated nonprofit organization.

In contrast, when a person lacks any one of the three cones or the sensitivity characteristics of any one of the three cones are shifted from the normal values, the person has color vision different from the above-described type C color vision. Color vision in the case where a person lacks the L cones out of the three types of cones or the sensitivity characteristics of the L cones are shifted from the normal values is referred to as protanopia (type P) color vision according to the CUDO's classification. Color vision in the case where a person lacks the M cones out of the three types of cones or the sensitivity characteristics of the M cones are shifted from the normal values is referred to as deuteranopia (type D) color vision according to the CUDO's classification. Color vision in the case where a person lacks the S cones or the sensitivity characteristics of the S cones are shifted from the normal values is referred to as tritanopia (type T) color vision. Color vision in the case where a person lacks two or three types of the L, M, and S cones is referred to as achromat (type A) color vision.

Note that type P color vision, type D color vision, type T color vision, and type A color vision (these color vision characteristics may collectively be referred to as color vision deficiency in the Specification, and people with such color vision characteristics may be referred to as people with color vision deficiency or color vision deficient people) are found in about 5% of men and about 0.2% of women. Many of color vision deficient people have type P color vision or type D color vision and their proportions occupy 99% or higher. The proportions of type T color vision and type A color vision are extremely lower than those of type P color vision and type D color vision.

Type P color vision is further divided into severe type (color-blindness) P color vision and weak type (partial color blindness) P color vision depending on whether a person lacks the L cones. Specifically, the case in which a person with P type color vision lacks the L cones is referred to as severe type P color vision, and the case in which P type color vision deficiency is caused by the shifted sensitivity characteristics of the L cones, though the L cones exist, is referred to as weak type P color vision.

Similarly, type D color vision is further divided into severe type D color vision lacking the M cones and weak type D color vision with the shifted sensitivity characteristics of the M cones.

Also, type T color vision is further divided into severe type T color vision lacking the S cones and weak type T color vision with the shifted characteristics of the S cones. The proportion of weak type T color vision in type T color vision is extremely smaller than the proportion of weak type D color vision in type D color vision or weak type P color vision in type P color vision.

Also, weak type P color vision, which is type P color vision with the shifted sensitivity characteristics of the L cones, has a different degree of color vision deficiency (color vision level) depending on how much the sensitivity characteristics of the L cones are shifted. That is, when a person with weak type P color vision has a small amount of sensitivity characteristics of the L cones that are shifted, the person has color vision closer to type C color vision. In contrast, when the amount of sensitivity characteristics of the L cones that are shifted is great and when the sensitivity characteristics of the L cones and the sensitivity characteristics of the M cones substantially overlap each other, that person has color vision closer to severe type P color vision lacking the L cones.

Similarly, weak type D color vision, which is type D color vision with the shifted sensitivity characteristics of the M cones, has a different degree of color vision deficiency (color vision level) depending on how much the sensitivity characteristics of the M cones are shifted. That is, when a person with weak type D color vision has a small amount of sensitivity characteristics of the M cones that are shifted, the person has color vision closer to type C color vision. In contrast, when the amount of sensitivity characteristics of the M cones that are shifted is great and when the sensitivity characteristics of the M cones and the sensitivity characteristics of the L cones substantially overlap each other, that person has color vision closer to severe type D color vision lacking the M cones.

Here, the sensitivity characteristics of the S, M, or L cones of people with color vision deficiency are different from those of people with type C color vision. As a result, there are combinations of colors that are difficult to be distinguished by color vision deficient people. Also, as has been described above, there are multiple types of color vision deficiency. The degree of color vision deficiency is different from one person to another. Thus, even among people with color vision deficiency, combinations of distinguishable colors and combinations of colors that are difficult to be distinguished may be different, depending on the type of color vision deficiency or the degree of color vision deficiency.

In recent years, in consideration of the above-described people with color vision deficiency, it is recommended to generate images or the like using color schemes that adopt colors distinguishable even by those people with color vision deficiency. Such color schemes include, for example, a color universal design coloration palette recommended by CUDO.

In such a color universal design coloration palette, multiple colors are selected so as to be easily distinguishable even by people with any type of color vision, such as type C, type P, type D, or type T color vision. By using this coloration palette, there is an advantage that an image that is distinguishable by many people is generated.

However, the color universal design coloration palette or the like has limited types or combinations of colors that are recommended to be used in order that colors are distinguishable by people with many types of color vision. Thus, images generated by using such a palette have limited designs, or, when people with type C color vision look at these images, they may feel awkward.

As has been described above, there are multiple types of color vision deficiency, such as type P color vision, type D color vision, and the like, and the degree of color vision deficiency varies in each type of color vision.

Depending on the uses or users of images to be generated, it may be unnecessary to generate an image that is easily distinguishable by all the color vision deficient people.

Therefore, in the first exemplary embodiment, the color vision parameter generator 30 generates a color vision parameter in accordance with the type of color vision and the degree of color vision (color vision level), and color processing in accordance with the type of color vision and the color vision level is executed by using the color vision parameter.

Next, the configuration of the color vision parameter generator 30 in the first exemplary embodiment and a color vision parameter generation process performed by the color vision parameter generator 30 will be described in more detail.

Figure 4A:
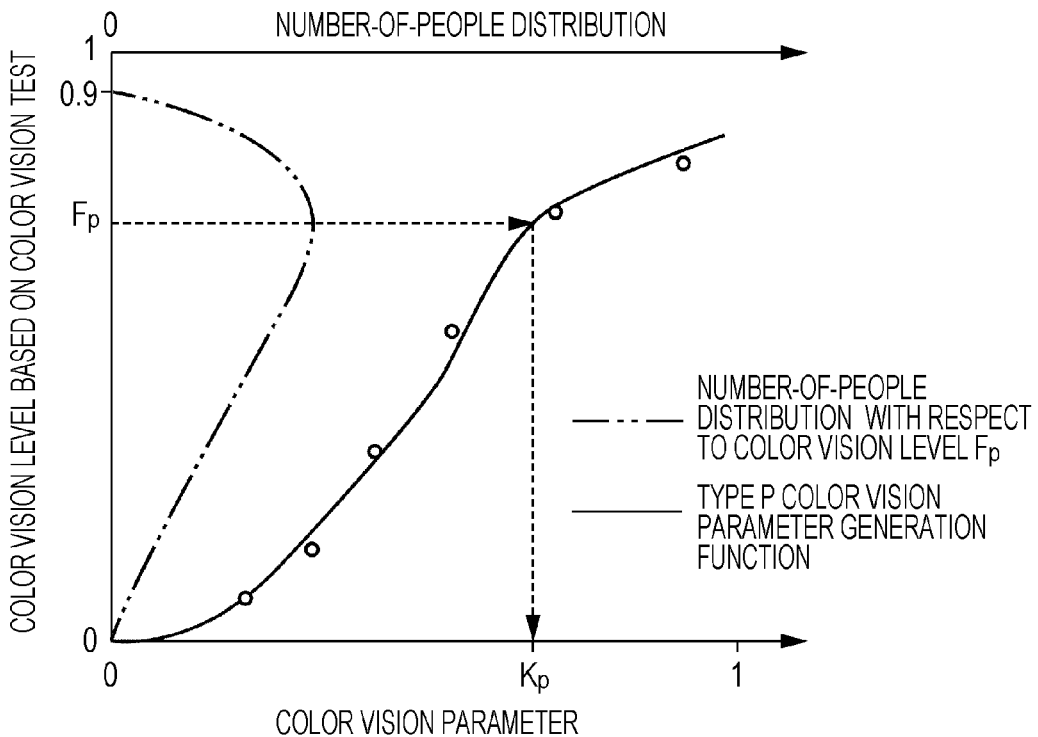
FIGS. 4A and 4B are graphs representing examples of a color vision parameter generation table used to generate a color vision parameter.
Figure 4B:
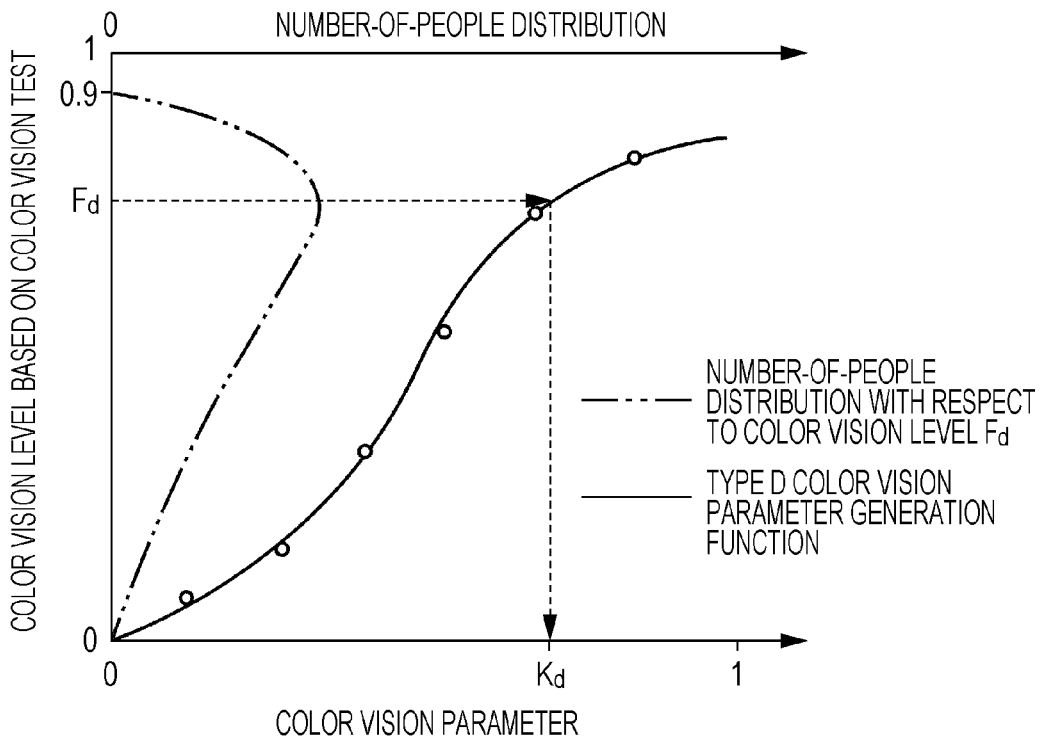

FIGS. 4A and 4B are graphs representing examples of a color vision parameter generation table used to generate a color vision parameter. The color vision parameter generator 30 in the first exemplary embodiment generates a color vision parameter by using the color vision parameter generation table illustrated in FIG. 4A or 4B.

The table memory 34 in the first exemplary embodiment stores multiple tables for the individual types of color vision deficiency. In this example, the table memory 34 stores a color vision parameter generation table for type P color vision, illustrated in FIG. 4A, and a color vision parameter generation table for type D color vision, illustrated in FIG. 4B.

In the color vision parameter generation table illustrated in FIG. 4A, a two-dot chain line indicates a number-of-people distribution with respect to a color vision level $F_p$ of type P color vision, which is obtained by a color vision test, of people with type P color vision. This number-of-people distribution is obtained from the result of a color vision test conducted on a certain population.

Note that the color vision level $F_p$ of type P color vision defines the degree of type P color vision from 0 to 1 on the basis of the result of a color vision test. In this example, when the color vision level $F_p$ of a person is 1 ($F_p=1$), it is indicated that the person has type C color vision (that is, does not have type P color vision). When the color vision level $F_p$ of a person is 0 ($F_p=0$), it is indicated that the person has severe type P color vision. Also in the first exemplary embodiment, when the color vision level $F_p$ of a person is within the range $0 \leq F_p \leq 0.9$, the person has weak type P color vision. In the example illustrated in FIG. 4A, among people on which a color vision test is conducted, the number-of-people distribution of people who have type P color vision and whose color vision levels $F_p$ are within the range $0 \leq F_p \leq 0.9$ is illustrated.

Although detailed descriptions are omitted here, a number-of-people distribution with respect to a color vision level $F_d$ of type D color vision, which is indicated by a two-dot chain line in FIG. 4B, is similarly obtainable as in the case of the number-of-people distribution with respect to the color vision level $F_p$ of type P color vision, which is illustrated in FIG. 4A.

In the following description, when the color vision level $F_p$ of type P color vision and the color vision level $F_d$ of type D color vision are not distinguished, they may simply be referred to as color vision levels F.

A color vision level F is obtainable by, for example, a color vision test using an anomaloscope. A color vision test using an anomaloscope determines the type of color vision deficiency (type P color vision or type D color vision) and the degree of color vision deficiency of a subject by performing a color match using light beams with particular wavelengths.

Specifically, there is a circular perspective vertically divided into two portions in the interior of an anomaloscope. In the upper half of the circular perspective, green light and red light are presented in an overlapping manner. In the lower half, yellow light, which serves as a reference in a color match, is presented. A subject looks into the anomaloscope and changes the mixing ratio of the green light and the red light, presented in the upper half of the perspective, so that the tone of the mixture of the green light and the red light becomes equivalent to the tone of the yellow light presented in the lower half of the perspective. The type and degree of color vision deficiency of the subject is obtainable from the mixing ratio of the red light and the green light at the time the subject has determined that the tone of the light in the upper half is equal to the tone of the light in the lower half.

As has been described above, because a person with type P color vision has a lower sensitivity of the L cones or lacks the L cones, this person tends to increase the mixing ratio of the red light when producing yellow light, compared with a person with type C color vision. In contrast, because a person with type D color vision has a lower sensitivity of the M cones or lacks the M cones, this person tends to increase the mixing ratio of the green light when producing yellow light, compared with a person with type C color vision.

On the basis of these tendencies, a color vision test using an anomaloscope compares the mixing ratio of the red light and the green light with reference values. When the mixing ratio of the red light is high, it is determined that the subject has type P color vision; when the mixing ratio of the green light is high, it is determined that the subject has type D color vision.

Further, for example, when the subject is determined to have type P color vision, the degree of type P color vision (severe type P color vision or weak type P color vision, and, in the case of weak type P color vision, the degree thereof) is determinable from how large the mixing ratio of the red light is with respect to the green light. In the first exemplary embodiment, the degree of type P color vision obtained by a color vision test using an anomaloscope is converted to the color vision level $F_p$ within the range $0 \leq F_p \leq 0.9$, as has been described above.

Similarly, when the subject is determined to have type D color vision, the degree of type D color vision (severe type D color vision or weak type D color vision, and, in the case of weak type D color vision, the degree thereof) is determinable from how large the mixing ratio of the green light is with respect to the red light, and the color vision level $F_d$ is obtainable.

In a color vision test using an anomaloscope, as has been described above, when the color vision of a subject is type P color vision or type D color vision, the degree of color vision deficiency of the subject is determinable. However, the degree of color vision deficiency is determined only by the mixing ratio of the green light and the red light in a color vision test using an anomaloscope, and the degree of color vision deficiency obtained by an anomaloscope does not necessarily correspond to the sensitivity characteristics of the L, M, and S cones of the subject.

The number-of-people distribution with respect to the color vision level $F_p$ of type P color vision, illustrated in FIG. 4A, and the number-of-people distribution with respect to the color vision level $F_d$ of type D color vision, illustrated in FIG. 4B, are obtained on the basis of the result of a color vision test using an anomaloscope described above, which has been conducted on a population including multiple subjects.

A population of subjects on which a color vision test using an anomaloscope is selectable in accordance with the use of the color processing apparatus 10 or the like. Such populations include, for example, a group of subjects selected from citizens with addresses in a certain prefecture, a group of patients of a certain hospital, and a group of students of a certain school.

Here, the number-of-people distribution with respect to the color vision level $F_p$ of type P color vision and the number-of-people distribution with respect to the color vision level $F_d$ of type D color vision normally follow the Gaussian distribution. Therefore, as illustrated in FIG. 4A, the number of people with type P color vision becomes maximum at a certain color vision level $F_p$, and, as illustrated in FIG. 4B, the number of people with type D color vision becomes maximum at a certain color vision level $F_d$.

In the color vision parameter generation table for type P color vision illustrated in FIG. 4A, a solid line indicates the relationship between the color vision level $F_p$ of type P color vision, obtained by the above-described color vision test, and a color vision parameter $K_p$. Hereinafter, the relationship between the color vision level $F_p$ and the color vision parameter $K_p$, indicated by the solid line in FIG. 4A, will be referred to as a type P color vision parameter generation function.

Similarly, in the color vision parameter generation table for type D color vision illustrated in FIG. 4B, a solid line indicates the relationship between the color vision level $F_d$ and a color vision parameter $K_d$ of type D color vision, and the relationship between the color vision level $F_d$ and the color vision parameter $K_d$, indicated by the solid line in FIG. 4B, will be referred to as a type D color vision parameter generation function.

In the following description, when the color vision parameter $K_p$ of type P color vision and the color vision parameter $K_d$ of type D color vision are not distinguished, they may simply be referred to as color vision parameters K.

The type P color vision parameter generation function illustrated in FIG. 4A is obtainable from the sensitivity characteristics of the L cones, M cones, and S cones (hereinafter may collectively be referred to as the LMS cones) of a subject, obtained by a so-called color matching experiment or the like, and a composite function that approximates the sensitivity characteristics of the LMS cones of the subject by the sensitivity characteristics of the LMS cones of a person with type C color vision and the sensitivity characteristics of the LMS cones of a person with severe type P color vision (type P color blind).

As has been described above, weak type P color vision, which is included in type P color vision, occurs because the peak wavelength of the sensitivity characteristics of the L cones (see FIG. 3) is shifted toward the M cones side (shorter wavelength side), compared with type C color vision. When the peak wavelength of the sensitivity characteristics of the L cones is shifted and overlaps the peak wavelength of the sensitivity characteristics of the M cones, it is considered that this gives rise to color vision similar to severe type P color vision lacking the L cones.

Accordingly, it is possible to approximate the sensitivity characteristics of the L, M, and S cones of a person with weak type P color vision by a composite function that combines the sensitivity characteristics of the LMS cones of a person with type C color vision and the sensitivity characteristics of the LMS cones of a person with severe type P color vision.

That is, the sensitivity characteristics ($L_{pw}$, $M_{pw}$, $S_{pw}$) of the LMS cones of a person with weak type P color vision are expressed by the following equation (1) using the color vision parameter $K_p$ ($0<K_p<1$) where ($L_c$, $M_c$, $S_c$) represents the sensitivity characteristics of the LMS cones of a person with type C color vision, and ($L_{ps}$, $M_{ps}$, $S_{ps}$) represents the sensitivity characteristics of the LMS cones of a person with severe type P color vision:

$$\begin{pmatrix} L_{pw} \\ M_{pw} \\ S_{pw} \end{pmatrix} = K_p \begin{pmatrix} L_c \\ M_c \\ S_c \end{pmatrix} + (1 - K_p) \begin{pmatrix} L_{ps} \\ M_{ps} \\ S_{ps} \end{pmatrix} \quad (1)$$

Note that the sensitivity characteristics ($L_{ps}$, $M_{ps}$, $S_{ps}$) of the LMS cones of a person with severe type P color vision, lacking the L cones, are expressed by the following equation (2) using, for example, the sensitivity characteristics ($L_c$, $M_c$, $S_c$) of the LMS cones of a person with type C color vision and the primary colors of the ITU-R BT.709 standard. Here, it is possible to obtain the sensitivity characteristics of the LMS cones of a person with type C color vision from known cone fundamentals of Smith and Pokorny, Hunt-Pointer-Estevez, Stockman-Sharpe, or the like.

$$\begin{pmatrix} L_{ps} \\ M_{ps} \\ S_{ps} \end{pmatrix} = (L_c M_c S_c \text{ to } L_{ps} M_{ps} S_{ps}) \begin{pmatrix} L_c \\ M_c \\ S_c \end{pmatrix} \quad (2)$$

$$= \begin{pmatrix} 0 & 2.02344 & -2.52581 \\ 0 & 1 & 0 \\ 0 & 0 & 1 \end{pmatrix} \begin{pmatrix} L_c \\ M_c \\ S_c \end{pmatrix}$$

Thus, a subject whose color vision level $F_p$ has been determined by a color vision test using an anomaloscope described above is further subjected to a color matching experiment to measure the sensitivity characteristics of the LMS cones, and the measured sensitivity characteristics of the LMS cones are compared with the above-described equation (1) to obtain a color vision parameter $K_p$ corresponding to the color vision level $F_p$ of the subject.

In the first exemplary embodiment, the sensitivity characteristics of the LMS cones of multiple subjects whose color vision levels $F_p$ have been measured are measured. For each of the subjects, a color vision parameter $K_p$ is calculated by using equation (1), and the relationship between the color vision parameter $K_p$ and the color vision level $F_p$ of each subject is approximated by a curve, thereby obtaining the type P color vision parameter generation function indicated by the solid line in FIG. 4A. This curve may be represented by an exponential curve, a logarithmic curve, a sigmoid curve, or the like.

The type D color vision parameter generation function indicated by the solid line in FIG. 4B is similarly obtainable as in the case of the type P color vision parameter generation function.

That is, the type D color vision parameter generation function illustrated in FIG. 4B is obtainable from the sensitivity characteristics of the LMS cones of a subject, obtained by a color matching experiment or the like, and a composite function that approximates the sensitivity characteristics of the LMS cones of the subject by the sensitivity characteristics of the LMS cones of a person with type C color vision and the sensitivity characteristics of the LMS cones of a person with severe type D color vision (type D color blind).

Specifically, the sensitivity characteristics ($L_{dw}$, $M_{dw}$, $S_{dw}$) of the LMS cones of a person with weak type D color vision are expressed by the following equation (3) using the color vision parameter $K_d$ ($0<K_d<1$) where ($L_c$, $M_c$, $S_c$) represents the sensitivity characteristics of the LMS cones of a person with type C color vision, and ($L_{ds}$, $M_{ds}$, $S_{ds}$) represents the sensitivity characteristics of the LMS cones of a person with severe type D color vision:

$$\begin{pmatrix} L_{dw} \\ M_{dw} \\ S_{dw} \end{pmatrix} = K_d \begin{pmatrix} L_c \\ M_c \\ S_c \end{pmatrix} + (1 - K_d) \begin{pmatrix} L_{ds} \\ M_{ds} \\ S_{ds} \end{pmatrix} \quad (3)$$

Note that the sensitivity characteristics of the LMS cones ($L_{ds}$, $M_{ds}$, $S_{ds}$) of a person with severe type D color vision, lacking the M cones, are expressed by the following equation (4) using, for example, the sensitivity characteristics ($L_c$, $M_c$, $S_c$) of a person with type C color vision and the primary colors of the ITU-R BT.709 standard:

$$\begin{pmatrix} L_{ds} \\ M_{ds} \\ S_{ds} \end{pmatrix} = (L_c M_c S_c \text{ to } L_{ds} M_{ds} S_{ds}) \begin{pmatrix} L_c \\ M_c \\ S_c \end{pmatrix} \quad (4)$$

$$= \begin{pmatrix} 1 & 0 & 0 \\ 0.494207 & 0 & 1.24827 \\ 0 & 0 & 1 \end{pmatrix} \begin{pmatrix} L_c \\ M_c \\ S_c \end{pmatrix}$$

Thus, the sensitivity characteristics of the LMS cones of a subject with type D color vision, measured by a color matching experiment, are compared with the above-described equation (3) to obtain a color vision parameter $K_d$ corresponding to the color vision level $F_d$ of the subject.

In the first exemplary embodiment, as has been described above, the sensitivity characteristics of the LMS cones of multiple subjects whose color vision levels $F_p$ have been measured are measured. For each of the subjects, a color vision parameter $K_d$ is calculated by using equation (3), and the relationship between the color vision parameter $K_d$ and the color vision level $F_d$ of each subject is approximated by a curve, thereby obtaining the type D color vision parameter generation function indicated by the solid line in FIG. 4B. This curve may be represented by an exponential curve, a logarithmic curve, a sigmoid curve, or the like.

Here, the color matching experiment is, for example, a method of measuring the amount of each of mixed light beams of the three primary colors, that is, red light, green light, and blue light, at the time the subject adjusts the mixture of the light beams of the three primary colors and sees the mixture as a color equivalent to test light serving as a comparison target. The sensitivity characteristics of the LMS cones of the subject are measurable by repeating the above-described measurement which sequentially uses multiple light beams with different wavelengths as a test light beam.

Besides the above-described method of using the light beams of the three primary colors, as an abbreviated method of measuring the sensitivity characteristics of the LMS cones, there is, for example, a method of presenting a color sequence of multiple colors to a subject and prompting the subject to select a combination of identifiable colors and a combination of unidentifiable colors. With this method, it is possible to estimate the sensitivity characteristics of the LMS cones of the subject on the basis of the selected combinations of colors.

The method of measuring the sensitivity characteristics of the LMS cones is not limited to the above-described methods, and another method is adoptable.

The color matching experiment for obtaining the sensitivity characteristics of the LMS cones takes time and effort, compared with a color vision test using an anomaloscope for determining the type and degree of color vision by measuring only the mixing ratio of green light and red light.

Thus, in the first exemplary embodiment, as has been described above, a color matching experiment is conducted on a few subjects selected from among subjects whose color vision levels F have been calculated by a color vision test using an anomaloscope, and, on the basis of the result thereof, the type P color vision parameter generation function, illustrated in FIG. 4A, and the type D color vision parameter generation function, illustrated in FIG. 4B, are obtained.

Figure 5:
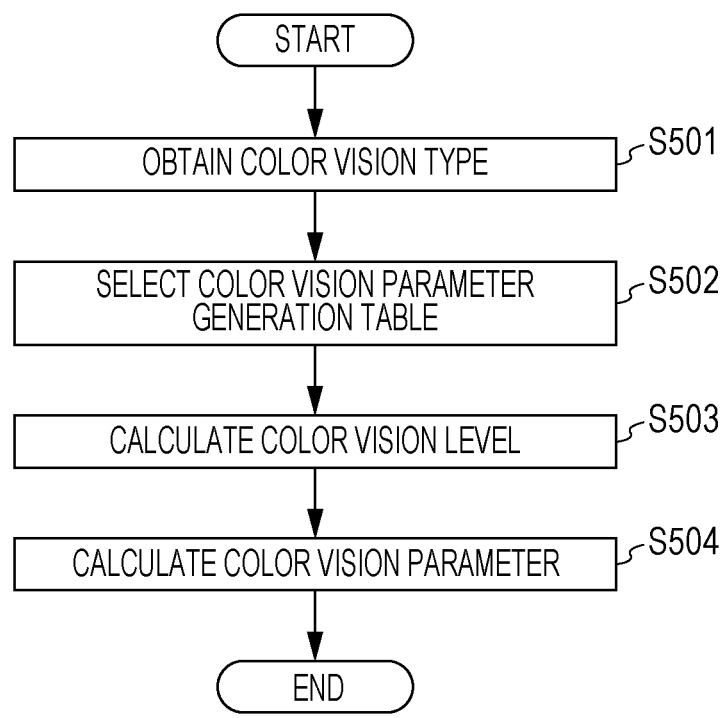
FIG. 5 is a flowchart illustrating a process executed by the color vision parameter generator.

FIG. 5 is a flowchart illustrating a process executed by the color vision parameter generator 30. In the first exemplary embodiment, a color vision parameter K used in color processing executed by the color processing executing unit 50 is generated by using the color vision parameter generation tables illustrated in FIGS. 4A and 4B.

Hereinafter, referring to FIGS. 2, 4A, 4B, and 5, the process executed by the color vision parameter generator 30 in the first exemplary embodiment will be described.

Firstly in the color vision parameter generator 30, the color vision information obtaining unit 31 obtains information regarding the type of color vision (type P color vision or type D color vision) for which a color vision parameter K is to be generated by the color vision information obtaining unit 31 (step S501). Information regarding the type of color vision is acceptable via the input accepting unit 20 (see FIG. 1). Here, it is assumed that type P color vision is input as the type of color vision via the input accepting unit 20.

Next, the color vision level calculating unit 32 selects a color vision parameter generation table stored in the table memory 34 on the basis of the type of color vision obtained by the color vision information obtaining unit 31 (step S502). In this example, since type P color vision has been input as the type of color vision, the color vision parameter generation table for type P color vision, illustrated in FIG. 4A, is selected.

Next, the color vision level calculating unit 32 calculates a color vision level F using the color vision parameter generation table selected in step S502 (step S503). In the first exemplary embodiment, for example, a color vision level F at which a number-of-people distribution with respect to the color vision level F in the color vision parameter generation table takes the maximum value is calculated by using the number-of-people distribution.

In this example, as illustrated in FIG. 4A, a color vision level $F_p$ at which a number-of-people distribution with respect to type P color vision $F_p$ in the color vision parameter generation table for type P color vision takes the maximum value is calculated on the basis of the number-of-people distribution.

Next, the color vision parameter calculating unit 33 calculates a color vision parameter K corresponding to the color vision level F calculated in step S503, by using the color vision parameter generation table (step S504).

In this example, a color vision parameter $K_p$ corresponding to the color vision level $F_p$ calculated in step S503 is calculated by using the type P color vision parameter generation function in the color vision parameter generation table.

With the foregoing steps, the color vision parameter generator 30 in the first exemplary embodiment is capable of obtaining the color vision parameter $K_p$ in accordance with the color vision level $F_p$ and the input type of color vision. The color vision parameter $K_p$ obtained by the color vision parameter generator 30 is sent to, for example, the color processing executing unit 50 (see FIG. 1) and used in color processing.

When type D color vision is input as the type of color vision in step S501, a color vision parameter $K_d$ is similarly calculatable by using the color vision parameter generation table for type D color vision, illustrated in FIG. 4B.

Although the color vision level calculating unit 32 calculates a color vision level F at which the number-of-people distribution takes the maximum value in the color vision parameter generation table in step S503 in the first exemplary embodiment here, the method of calculating a color vision level F is not limited to that described above. For example, the average of color vision levels F of people with color vision deficiency in a population may be calculated, or a color vision level F may be calculated so that a predetermined percentage of a population are color vision deficient people (such as 30% who have higher degrees of color vision deficiency among color vision deficient people, or 100% of the population).

Note that the method of calculating a color vision level F by the color vision level calculating unit 32 is selectable by the user via, for example, the input accepting unit 20 (see FIG. 1). In this case, information regarding the method of calculating a color vision level F, accepted via the input accepting unit 20, is obtained in, for example, step S501 described above, together with the type of color vision obtained by the color vision information obtaining unit 31 described above. In step S503, the color vision level calculating unit 32 calculates a color vision level F by using the method of calculating a color vision level F, which is obtained by the color vision information obtaining unit 31.

Next, color processing executed by the color processing executing unit 50 using the color vision parameter K generated by the color vision parameter generator 30 will be described.

Figure 6:
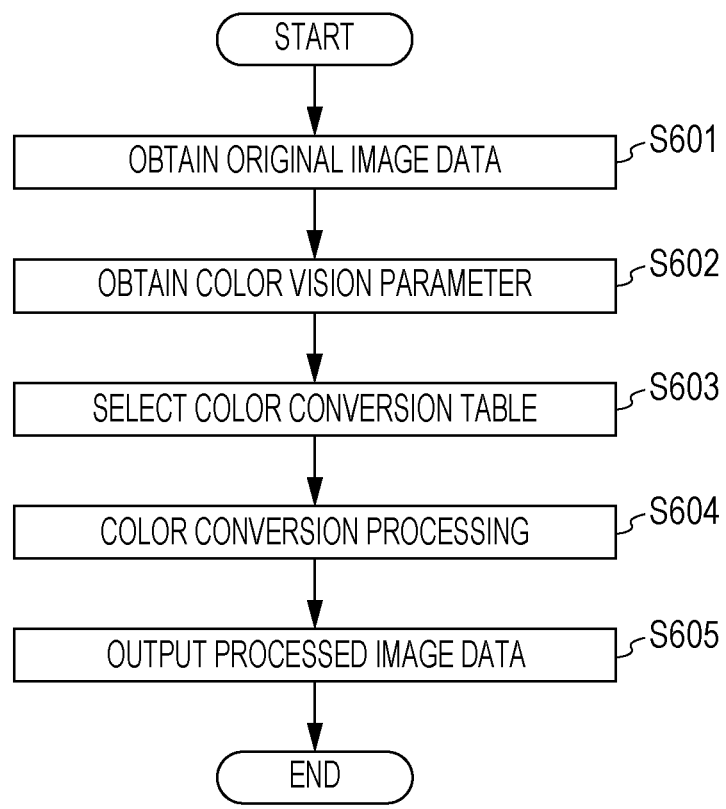
FIG. 6 is a flowchart illustrating color processing executed by a color processing executing unit.

FIG. 6 is a flowchart illustrating color processing executed by the color processing executing unit 50. Referring now to FIGS. 1 and 6, a process executed by the color processing executing unit 50 in the first exemplary embodiment will be described.

Firstly, the color processing executing unit 50 obtains image data (hereinafter referred to as original image data), serving as a target on which color processing is executed, via the input accepting unit 20 (step S601).

Next, the color processing executing unit 50 obtains the color vision parameter K generated by the color vision parameter generator 30 (step S602). In step S602, the type of color vision (type P color vision or type D color vision) accepted via the input accepting unit 20 upon generation of the color vision parameter K may additionally be obtained.

Next, the color processing executing unit 50 selects a color conversion table used in color processing from the memory 40 (step S603). The memory 40 in the first exemplary embodiment stores multiple color conversion tables, in accordance with the value of the color vision parameter K, for the individual types of color vision. Thus, in step S603, a color conversion table corresponding to the color vision parameter K obtained in step S602 is selected from among the multiple color conversion tables stored in the memory 40.

Next, the color processing executing unit 50 applies color conversion processing to the original image data using the color conversion table selected in step S603 (step S604). The color-conversion-processed image data will be referred to as processed image data.

Here, the color conversion tables stored in the memory 40 are tables for color-converting the original image data to an image whose colors are easily distinguishable even by people with color vision deficiency. In step S603, a color conversion table corresponding to the color vision parameter K is selected. In step S604, color conversion processing is applied to the original image data using the color conversion table, thereby obtaining the processed image data whose colors are easily distinguishable by color vision deficient people whose degrees of color vision are the color vision level F corresponding to the color vision parameter K and color vision deficient people whose degrees of color vision are higher than the color vision level F (closer to people with type C color vision).

The color processing executing unit 50 sends the processed image data to the output unit 60 (step S605), and a series of steps ends.

The processed image data sent to the output unit 60 in step S605 is output from the output unit 60 to the image forming apparatus 11 and the display apparatus 12 in response to an instruction or the like accepted by the input accepting unit 20.

Accordingly, the color processing executing unit 50 in the first exemplary embodiment applies color conversion processing to the original image data using the color conversion table corresponding to the color vision parameter K. As a result, it is possible to obtain the processed image data on which color processing in accordance with the color vision level F corresponding to the color vision parameter K has been applied.

Besides the above-described method of using the color conversion table, the processed image data may be obtained by converting the color signals of the original image data using a color conversion function using the color vision parameter K or the like. In this case, for example, the color signals of the original image data (such as the RGB color signals (R, G, B)) are converted to LMS cone response signals (L, M, S). Conversion from the RGB signals (R, G, B) to the LMS cone response signals (L, M, S) is executable using, for example, the following equation (5):

$$\begin{pmatrix} L \\ M \\ S \end{pmatrix} = (RGB \text{ to } LMS) \begin{pmatrix} R \\ G \\ B \end{pmatrix} \quad (5)$$

$$= \begin{pmatrix} 17.8824 & 43.5161 & 4.11935 \\ 3.45565 & 27.1554 & 3.86714 \\ 0.0299566 & 0.184309 & 1.46709 \end{pmatrix} \begin{pmatrix} R \\ G \\ B \end{pmatrix}$$

Next, the LMS cone response signals (L, M, S) calculated by equation (5) are converted to LMS cone response signals (L', M', S') corresponding to the color vision level F of people with color vision deficiency by using a color conversion matrix C(K) with the color vision parameter K as a variable (equation (6)):

$$\begin{pmatrix} L' \\ M' \\ S' \end{pmatrix} = C(K) \begin{pmatrix} L \\ M \\ S \end{pmatrix} \quad (6)$$

Thereafter, the converted LMS cone response signals (L', M', S') are converted again to RGB signals (R', G', B') (equation (7)), thereby obtaining the color signals of the processed image data in accordance with the color vision level F corresponding to the color vision parameter K:

$$\begin{pmatrix} R' \\ G' \\ B' \end{pmatrix} = (LMS \text{ to } RGB) \begin{pmatrix} L' \\ M' \\ S' \end{pmatrix} \quad (7)$$

$$= \begin{pmatrix} 0.80944 & -0.130504 & 0.116721 \\ -0.0102485 & 0.0540194 & -0.113615 \\ -0.000365294 & -0.00412163 & 0.693513 \end{pmatrix} \begin{pmatrix} L' \\ M' \\ S' \end{pmatrix}$$

The color vision parameter K generated by the color vision parameter generator 30 in the first exemplary embodiment may be used to, for example, select a coloration palette used in generating a color image with word processing software, spreadsheet software, or the like. That is, for example, multiple coloration palettes corresponding to the color vision parameter K may be stored in the memory 40; a corresponding coloration palette may be selected from among these coloration palettes in accordance with the value of the color vision parameter K generated by the color vision parameter generator 30; and the selected coloration palette may be displayed via the display apparatus 12 or the like.

With such a configuration, for example, it becomes possible to use a coloration palette in accordance with the color vision level F corresponding to the color vision parameter K in generating a color image with word processing software, spreadsheet software, or the like, and to generate an image in accordance with the color vision level F.

Although the configuration for generating, from a color image corresponding to type C color vision, a color image for other color vision deficient people has been described here, the configuration is not limited thereto. For example, an arbitrary color image may be generated, such as generation of a color image for people with type C color vision from a color image for people with type D color vision with a certain color vision level.

Although the color vision level F is set on the basis of a color vision test using an anomaloscope in the first exemplary embodiment, any testing method other than that using an anomaloscope may be used as long as the degree of color vision deficiency is determinable.

Although the color vision parameter K ($K_p$, $K_d$) corresponding to type P color vision or type D color vision is generated using the color vision parameter generation table corresponding to type P color vision or type D color vision in the first exemplary embodiment, additional color vision parameter generation tables corresponding to, for example, type T color vision and type A color vision, in addition to type P color vision and type D color vision, may be similarly prepared, and color vision parameters K may be similarly generated.

Although the color vision parameter K corresponding to each of type P color vision and type D color vision is generated in accordance with the CUDO's color vision classification in the first exemplary embodiment, this color vision classification is only one example. The color vision classification does not necessarily conform to the CUDO's color vision classification, and the color vision parameter K may be generated on the basis of other classifications.

Second Exemplary Embodiment

In the above-described first exemplary embodiment, the color vision parameter K is calculated using the number-of-people distribution in accordance with the color vision level F in the color vision parameter generation table. In a second exemplary embodiment, the type of color vision and the degree of color vision (color vision level F) serving as a target of image processing are obtained in advance, and the color vision parameter K is directly generated on the basis of the obtained type of color vision and the color vision level F. The configuration of the color processing apparatus 10 (see FIG. 1) and the color vision parameter generator 30 (see FIG. 2) in the color processing apparatus 10 according to the second exemplary embodiment are the same as those in the above-described first exemplary embodiment.

Hereinafter, the second exemplary embodiment of the invention will be described. The same or similar configuration as that in the first exemplary embodiment is given the same reference numeral as that in the first exemplary embodiment, and a detailed description thereof is omitted here.

Figure 7:
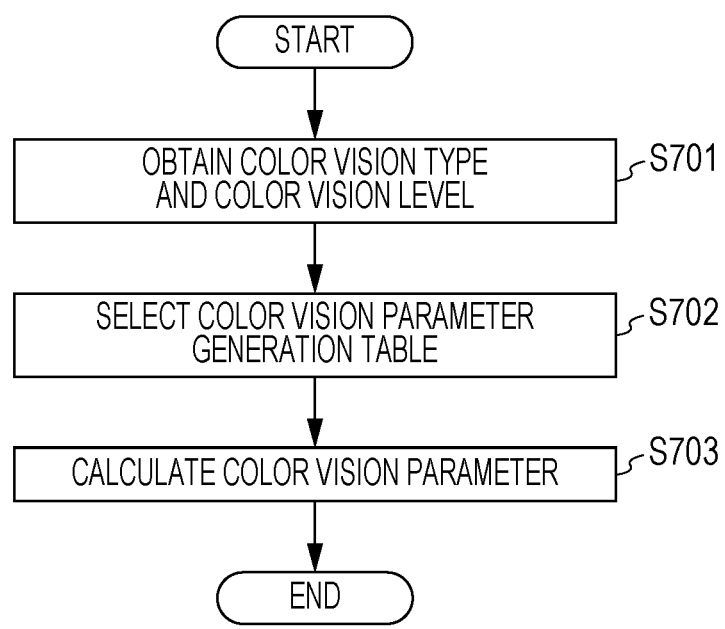
FIG. 7 is a flowchart illustrating a process executed by the color vision parameter generator according to a second exemplary embodiment.

FIG. 7 is a flowchart illustrating a process executed by the color vision parameter generator 30 in the second exemplary embodiment.

Firstly in the color vision parameter generator 30 in the second exemplary embodiment, the color vision information obtaining unit 31 (see FIG. 2) obtains information regarding the type of color vision (type P color vision or type D color vision) for which a color vision parameter K is to be generated, and the degree of color vision (color vision level F) (step S701).

Next, the color vision parameter calculating unit 33 selects a color vision parameter generation table stored in the table memory 34 on the basis of the type of color vision obtained in step S701 (step S702).

Next, the color vision parameter calculating unit 33 calculates, on the basis of the color vision level F obtained in step S701, a color vision parameter K corresponding to the color vision level F using the color vision parameter generation table selected in step S702 (step S703).

With the foregoing steps, the color vision parameter generator 30 in the second exemplary embodiment is capable of obtaining the color vision parameter K in accordance with the input type of color vision and the color vision level F. The color vision parameter K obtained by the color vision parameter generator 30 is sent to, for example, the color processing executing unit 50 (see FIG. 1) and used in color conversion processing, such as that discussed in the first exemplary embodiment.

Color vision parameter generation processing according to the above-described first exemplary embodiment or second exemplary embodiment may be realized with a general computer. Here, it is assumed that this processing is realized with a computer 90, and the hardware configuration thereof will be described.

Figure 8:
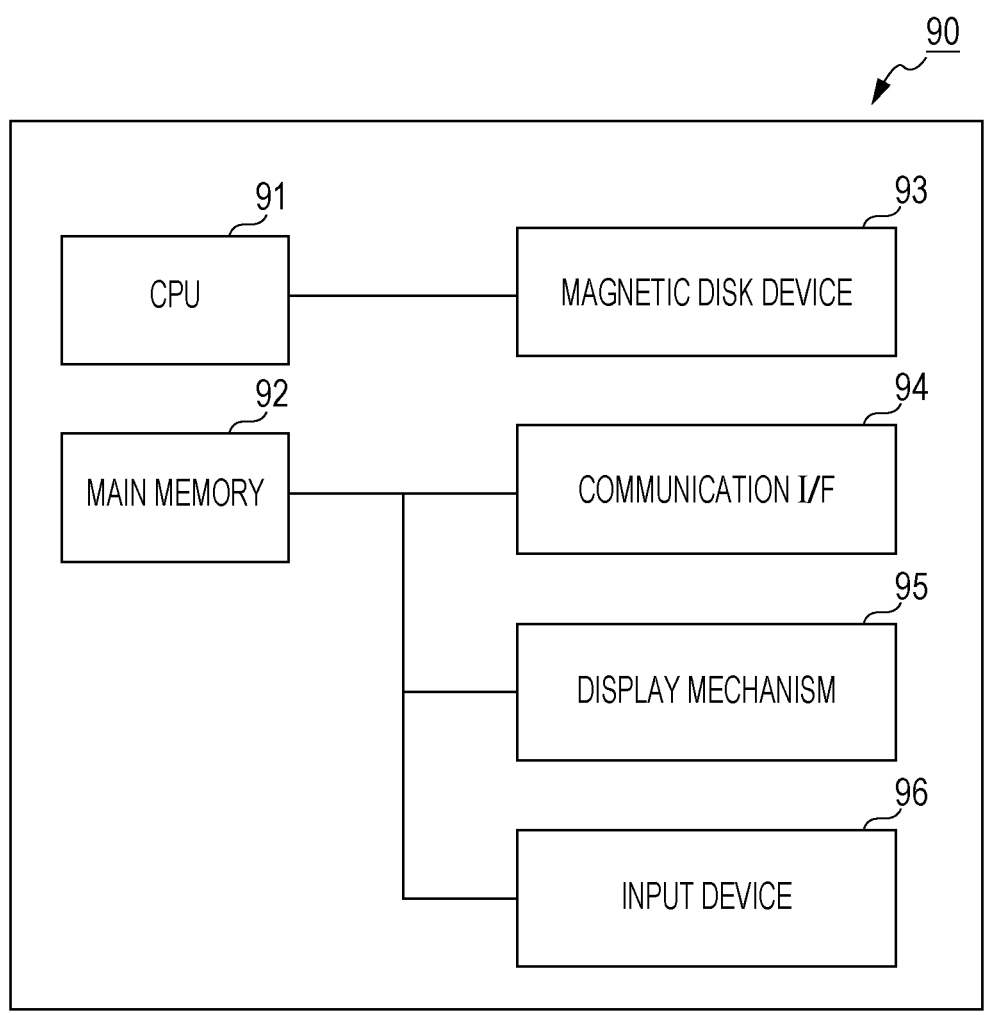
FIG. 8 is a block diagram illustrating the hardware configuration of a computer.

FIG. 8 is a block diagram illustrating the hardware configuration of the computer 90.

As illustrated in FIG. 8, the computer 90 includes a central processing unit (CPU) 91 that executes various types of software including an operating system (OS) and applications, a main memory 92 that stores these various types of software, data used in execution thereof, and the like, and a magnetic disk device 93 that stores data input to these various types of software, data output from these various types of software, and the like. Further, the computer 90 includes a communication interface (I/F) 94 for performing communication with the outside, a display mechanism 95 including a video memory and a display, and an input device 96 including a keyboard, a mouse, and the like.

A program realizing the exemplary embodiments may be provided by a communication unit, or may be stored on a storage medium such as a compact-disc read-only memory (CD-ROM) and provided.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A color conversion coefficient generating apparatus comprising:
    a color vision degree coefficient calculating unit configured to calculate a color vision degree coefficient indicating a degree of color vision deficiency; and
    a color conversion coefficient calculating unit configured to calculate a color conversion coefficient used to convert an input color value, on the basis of correspondence between the color vision degree coefficient and sensitivity characteristics of long- (L), medium- (M), and short- (S) wavelength-sensitive cones,
    wherein the degree of color vision deficiency indicates a severe color vision or weak color vision, and in the case of weak color vision, the degree thereof.

2. The color conversion coefficient generating apparatus according to claim 1, wherein the color conversion coefficient calculating unit is configured to calculate the color conversion coefficient on the basis of a composite function of sensitivity characteristics of the L, M, and S cones of a person with normal color vision and sensitivity characteristics of the L, M, and S cones of a person with color vision deficiency.

3. The color conversion coefficient generating apparatus according to claim 1, wherein the color vision degree coefficient corresponds to the degree of color vision deficiency obtained by a color vision test.

4. The color conversion coefficient generating apparatus according to claim 2, wherein the color vision degree coefficient corresponds to the degree of color vision deficiency obtained by a color vision test.

5. The color conversion coefficient generating apparatus according to claim 1, wherein the color vision degree coefficient calculating unit is configured to calculate the color vision degree coefficient on the basis of a number-of-people distribution of a test result obtained by a color vision test conducted on a predetermined group of people.

6. The color conversion coefficient generating apparatus according to claim 2, wherein the color vision degree coefficient calculating unit is configured to calculate the color vision degree coefficient on the basis of a number-of-people distribution of a test result obtained by a color vision test conducted on a predetermined group of people.

7. The color conversion coefficient generating apparatus according to claim 3, wherein the color vision degree coefficient calculating unit is configured to calculate the color vision degree coefficient on the basis of a number-of-people distribution of a test result obtained by a color vision test conducted on a predetermined group of people.

8. The color conversion coefficient generating apparatus according to claim 4, wherein the color vision degree coefficient calculating unit is configured to calculate the color vision degree coefficient on the basis of a number-of-people distribution of a test result obtained by a color vision test conducted on a predetermined group of people.

9. The color conversion coefficient generating apparatus according to claim 1, further comprising:
    an accepting unit configured to accept information regarding the degree of color vision deficiency,
    wherein the color vision degree coefficient calculating unit is configured to calculate the color vision degree coefficient on the basis of the information regarding the degree of color vision deficiency, accepted by the accepting unit.

10. The color conversion coefficient generating apparatus according to claim 2, further comprising:
    an accepting unit configured to accept information regarding the degree of color vision deficiency,
    wherein the color vision degree coefficient calculating unit is configured to calculate the color vision degree coefficient on the basis of the information regarding the degree of color vision deficiency, accepted by the accepting unit.

11. The color conversion coefficient generating apparatus according to claim 3, further comprising:
    an accepting unit configured to accept information regarding the degree of color vision deficiency,
    wherein the color vision degree coefficient calculating unit is configured to calculate the color vision degree coefficient on the basis of the information regarding the degree of color vision deficiency, accepted by the accepting unit.

12. The color conversion coefficient generating apparatus according to claim 4, further comprising:
    an accepting unit configured to accept information regarding the degree of color vision deficiency,
    wherein the color vision degree coefficient calculating unit is configured to calculate the color vision degree coefficient on the basis of the information regarding the degree of color vision deficiency, accepted by the accepting unit.

13. The color conversion coefficient generating apparatus according to claim 1, wherein the degree of color vision deficiency comprises a deficiency value in a range between 0 and 0.9.

14. The color conversion coefficient generating apparatus according to claim 1, wherein the color conversion coefficient calculating unit is configured to generate a color conversion coefficient function based on a relationship between the color vision degree coefficient and the color conversion coefficient.

15. A color conversion coefficient generating method comprising:
    calculating a color vision degree coefficient indicating a degree of color vision deficiency; and
    calculating a color conversion coefficient used to convert an input color value, on the basis of correspondence between the calculated color vision degree coefficient and sensitivity characteristics of long- (L), medium- (M), and short- (S) wavelength-sensitive cones,
    wherein the degree of color vision deficiency indicates a severe color vision or weak color vision, and in the case of weak color vision, the degree thereof.

16. A color processing apparatus comprising:
    an obtaining unit configured to obtain a color value serving as a target of color processing;
    a color vision degree coefficient calculating unit configured to calculate a color vision degree coefficient indicating a degree of color vision deficiency;
    a color conversion coefficient calculating unit configured to calculate a color conversion coefficient used to convert the color value, obtained by the obtaining unit, on the basis of correspondence between the color vision degree coefficient, calculated by the color vision degree coefficient calculating unit, and sensitivity characteristics of long- (L), medium- (M), and short- (S) wavelength-sensitive cones; and a color processing unit configured to apply color conversion processing to the color value using the color conversion coefficient calculated by the color conversion coefficient calculating unit, wherein the degree of color vision deficiency indicates a severe color vision or weak color vision, and in the case of weak color vision, the degree thereof.

17. A non-transitory computer readable medium storing a program causing a computer to execute a process, the process comprising:

calculating a color vision degree coefficient indicating a degree of color vision deficiency; and calculating a color conversion coefficient used to convert an input color value, on the basis of correspondence between the calculated color vision degree coefficient and sensitivity characteristics of long- (L), medium- (M), and short- (S) wavelength-sensitive cones, wherein the degree of color vision deficiency indicates a severe color vision or weak vision, and in the case of weak color vision, the degree thereof.

* * * * *